United States Patent
Negoro

(10) Patent No.: US 6,335,605 B1
(45) Date of Patent: Jan. 1, 2002

(54) VECTOR CONTROLLER FOR INDUCTION MOTOR

(75) Inventor: Hideto Negoro, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/597,419

(22) Filed: Jun. 19, 2000

(30) Foreign Application Priority Data

Dec. 8, 1999 (JP) .................................................. 11-348954

(51) Int. Cl.[7] ................................. H02P 1/24; H02P 1/42; H02P 3/18; H02P 5/28; H02P 7/36
(52) U.S. Cl. ............................................................. 318/727
(58) Field of Search ....................................... 318/727–730

(56) References Cited

U.S. PATENT DOCUMENTS 4,780,658 A * 10/1988 Koyama
5,365,158 A * 11/1994 Tanaka et al.
5,448,150 A * 9/1995 Yamamoto et al.
6,184,638 B1 * 2/2001 Kinpara

FOREIGN PATENT DOCUMENTS

JP 6-343282 12/1994

* cited by examiner

*Primary Examiner*—Jeffrey Donels
(74) *Attorney, Agent, or Firm*—Sughrue Mion, PLLC

(57) ABSTRACT

A vector controller for an induction motor that conducts vector control by computing a d-axis current command value, a q-axis current command value, and a slip angular frequency command value based on a torque command value, a secondary magnetic flux command value, and aN induction motor constant has circuitry for automatically adjusting a correction value of secondary resistance. A secondary resistance correction value computing unit 10 calculates a secondary resistance correction value by using d-axis and q-axis feed-forward voltage command values, d-axis and q-axis voltage command values, a torque current command value, and a magnetic flux current command value. A vector control command computing unit 1 uses the computed secondary resistance correction value to carry out vector control of an induction motor.

8 Claims, 14 Drawing Sheets

VECTOR CONTROLLER FOR INDUCTION MOTOR

BACKGROUND OF THE INVENTION

1. Field of the Invention

The present invention relates to a vector controller for an induction motor and, more particularly, to a vector controller for an induction motor that is capable of automatically adjusting a set value of a secondary resistance of the induction motor, namely, a resistance of a rotor of the induction motor.

2. Description of the Related Art

In general, vector control has been extensively used in industrial fields as a method for quick control of an output torque of an induction motor. The following will briefly describe the vector control.

The vector control is carried out to independently control a torque and a secondary magnetic flux of an induction motor by representing a current or magnetic flux of a three-phase induction motor in terms of a vector of a coordinate system known as a d-q coordinate system. The d-q coordinate system is a rotating coordinate system with two orthogonal axes that rotate in synchronization with a power source, one of the axes being taken in a direction of a secondary magnetic flux.

In the vector control, a torque current command value IQR, a magnetic flux current command value IDR, and a slip angular frequency command value ωs* are computed according to the following expressions (1) through (3) using a torque command value T*, a secondary magnetic flux command value Φ2* and a motor constant. A method for deriving the expressions is well known, and described in, for example, "Vector Control of AC Motor" by Takayoshi Nakano, published by Nikkan Kogyo Shimbunsha; therefore, the description of the method will be omitted herein.

$$IQR = \frac{T^*}{\Phi2^*} \times \frac{1}{P} \times \frac{L2}{M} \quad (1)$$

$$IDR = \frac{\Phi2^*}{M} \quad (2)$$

$$\omega s^* = \frac{IQR}{IDR} \times \frac{R2}{L2} \quad (3)$$

where

P: Number of pairs of poles of motor

M: Mutual inductance of motor (H)

L1: Primary self inductance of motor (H)

L2: Secondary self inductance of motor (H)

R2: Secondary resistance value of motor (Ω)

Thus, in the vector control, the slip angular frequency command value ωs* is computed according to expression (3) to conduct the control. Expression (3) includes the secondary resistance value R2 of the motor. The value of R2 varies with changes in an ambient temperature or temperature changes caused by heat generated by the induction motor itself. Therefore, for the value of R2 employed for the computation in accordance with expression (3), a value corrected by taking into account a predicted change of R2 caused by a temperature change must be used.

As a known vector controller that takes such a secondary resistance correction into account, there is one disclosed in, for example, Japanese Patent Laid-Open No. 6-343282. FIG. 12 is a block diagram showing a configuration of the known vector controller. The vector controller shown in FIG. 12 includes a vector control unit 49 for controlling an induction motor 55 to be controlled according to a secondary magnetic flux command Φ2* and a torque command TM*, a waveform analyzing unit 50 that receives an induction motor revolution angular velocity ωr (hereinafter referred to simply as "angular velocity ωr) and performs a waveform analysis on the angular velocity or, a parameter adjusting unit 51 for adjusting a parameter (a set value of the secondary resistance in this example) according to an output of the waveform analyzing unit 50, a subtracter 52 that subtracts the angular velocity ωr from a velocity command ωr* to compute a velocity deviation, and a velocity controller 53 that outputs the torque command value TM* based on a difference between the velocity command ωr* and the angular velocity ωr determined by the subtracter 52 so that the angular velocity ωr follows the velocity command ωr*. The vector controller further includes a power converting unit 54 that controls a primary current value I1 according to a primary current command value I1* output from the vector control unit 49, the induction motor 55 to be controlled that rotates at a predetermined velocity and a predetermined torque according to the primary current value I1, a velocity detector 56 that detects the angular velocity ωr of the induction motor 55, and coefficient setters 57 and 58 for a secondary resistance R2 installed in the vector control unit 49. The following will describe an operation of the related art based mainly on a secondary resistance correction method.

In the related art, a signal that has been step-changed to the velocity command ωr* is input to perform computation for correcting the secondary resistance. A waveform of the angular velocity or when the velocity command ωr* has been step-changed is saved in the waveform analyzing unit 50, and a feature quantity of a response waveform is calculated. The feature quantity calculated by the waveform analyzing unit 50 is supplied to the parameter adjusting unit 51 to calculate a correction amount of the secondary resistance set value R2 so as to correct a set value of the secondary resistance R2 set at the coefficient setters 57 and 58.

FIG. 13 illustrates a configuration example of the waveform analyzing unit 50. A waveform of the angular velocity ωr is sampled by a sample holding circuit 501 and saved in a memory 502, then a feature quantity is calculated by a microprocessor 503. An example of a specific characteristic value employed as the feature quantity and a method for determining the specific characteristic will be discussed later in detail.

A configuration example of the parameter adjusting unit 51 is constituted by a microprocessor and a memory similarly as in the case of the waveform analyzing unit 50 shown in FIG. 13. The figure will be omitted because it is identical to FIG. 13 except for the absence of the sample holding circuit. In this case, an adjustment rule based on a feature quantity is stored in the memory.

Regarding the adjustment of the secondary resistance, the adjustment rule decides a feature quantity to be calculated by the waveform analyzing unit 50 and how a correction amount of the secondary resistance is determined by the parameter adjusting unit 51 by employing the feature quantity. An example of the adjustment rule will be described in conjunction with FIG. 14. FIG. 14 shows simulation results illustrating influences exerted by an erroneous setting of the secondary resistance R2 on a velocity step response waveform. The response waveform is also subjected to influences of a transfer function of the velocity controller 53. Hence, for the purpose of simplicity, in the response waveform of FIG. 14, the transfer function of the velocity controller 53 includes only a proportion factor.

When a true value of the secondary resistance R2 is denoted as R2*, FIG. 14A illustrates a case wherein the value of the secondary resistance R2 set in the vector controller is equal to the true value R2* (R2=R2*). In this case, the torque command TM*, which is an output of the velocity controller 53, and an actually generated torque TM of the induction motor 55 are equal. Therefore, a transfer function of the velocity ωr of the induction motor 55 with respect to the torque command TM* will be determined by the following expression (4), where J denotes a moment of inertia of the induction motor 55, and S denotes a Laplacean.

$$(\omega r/TM^*)=(1/J \cdot S) \quad (4)$$

Therefore, when a proportion gain of the velocity controller 53 is denoted as GP, a closed loop transfer function Gω of the velocity ωr in relation to the velocity command ωr* will be determined by the following expression:

$$G\omega=(\omega r/\omega r^*)=[GP/J \cdot S]/[1+GP/J \cdot S]=1/[1+(J/GP)S] \quad (5)$$

The above expression (5) represents a transfer function of a primary delay factor having a time constant expressed as J/GP, and a step response waveform thereof will be represented by the following expression (6), where a step amount of the velocity command is denoted by Δω.

$$\omega r(t)=\{1-\exp[-(GP/J)t]\}\Delta\omega \quad (6)$$

FIG. 14A illustrates a waveform based on the above expression, FIG. 14B illustrates a case wherein R2>R2* and a value of the secondary resistance R2 set at the vector controller is larger than the true value R2*. In this case, an excessive torque is generated with a consequent overshoot in a response. As a result, a rise is faster than that in a case wherein R2=R2*.

FIG. 14C illustrates a case wherein R2<R2*, that is, a value of the secondary resistance R2 set at the vector controller is smaller than the true value R2*. In this case, an insufficient torque is generated, taking a longer time for velocity to reach a final value. As a result, the rise is delayed compared with the case wherein R2=R2*.

Thus, an erroneous setting of the secondary resistance R2 can be visually recognized in the form of a difference in velocity step response waveform. The difference is calculated as a difference in a feature quantity of a response waveform and used for adjusting the secondary resistance.

Diverse quantities can be used as the feature quantities. An example is a time T95 required for the velocity ωr to reach 95% of a step amount Δω, meaning that a rise time is used as a feature quantity. When the setting of the secondary resistance is correct, the response waveform is represented by expression (6), so that a rise time T95* will be a function of a time constant (J/GP) as shown by the following expression:

$$T95^*=(J/GP)ln(20)=2.996(J/GP) \quad (7)$$

As is obvious from FIG. 14, T95 of the step response waveform obtained when R2>R2* is smaller than T95* of the above expression (7), while T95 obtained when R2<R2* is larger than T95* of the above expression.

Accordingly, the secondary resistance R2 can be corrected by an adjustment rule described from (1) through (3) below.

(1) The velocity command ωr* is step-changed by velocity control, and the rise time T95 of the velocity ωr during the step change is measured.

(2) If the rise time T95 of the velocity ωr is T95<T95*, then R2>R2*; therefore, the value of the secondary resistance R2 set at the vector controller is reduced.

(3) If the rise time T95 of the velocity ωr is T95>T95*, then R2<R2*; therefore, the value of the secondary resistance R2 set at the vector controller is increased.

The following will describe a specific example. Referring to FIG. 13, the velocity command ωr* is step-changed by velocity control, and values of response waveforms of the velocity ωr sampled at appropriate sampling cycles during the step change are stored in the memory 502. Based on the response waveforms stored by the microprocessor 503, the rise time T95 is calculated as a feature quantity and supplies the calculation result to the parameter adjusting unit 51. The parameter adjusting unit 51 compares T95 and T95*, and determines a correction amount ΔR2 of the secondary resistance set value R2 according to expression (8) shown below:

$$\Delta R2=Kr(T95-T95^*) \quad (8)$$

Kr denotes a gain for determining the correction amount from the feature quantity. The value of ΔR2 thus determined is added to the current secondary resistance set value to calculate a new R2 so as to correct the value set at the vector controller. Thereafter, a step response of the foregoing angular velocity is performed again.

The known vector controller for an induction motor that is capable of automatically adjusting a set value of the secondary resistance of the induction motor has the aforesaid configuration and performs operation as described above. This system allows the set value of the secondary resistance to be adjusted. However, there has been a problem in that a vector controller that does not have the velocity command ωr* is incapable of correcting the secondary resistance according to the known system. There has been another problem in that, even if the vector controller has the velocity command, a special operation has to be performed for correcting the secondary resistance in an application wherein the velocity command is not step-changed during operation.

Thus, the known vector controller described above has not been entirely satisfactory as a vector controller for an induction motor that is capable of automatically adjusting a set value of a secondary resistance.

SUMMARY OF THE INVENTION

Accordingly, the present invention has been made with a view toward solving the problems described above, and it is an object thereof to provide a vector controller for an induction motor that is capable of automatically adjusting a set value of a secondary resistance by a simple method without the need for any special signal for adjusting the secondary resistance regardless of the presence of a velocity command.

With the above objects in view, the vector controller for an induction motor of the present invention comprises a vector control command computing means for computing a d-axis current command value IDR, a q-axis current command value IQR and a slip angular frequency command value ωs* based on a torque command value T*, a secondary magnetic flux command value Φ2* and an induction motor constant of an induction motor to be controlled; a revolution angular frequency computing means for computing a revolution angular frequency ωr of the induction motor; an inverter angular frequency computing means for computing an inverter angular frequency ωinv by adding the slip angular frequency command value ωs* and the revolution angular frequency ωr; a dq-axis feed-forward voltage computing means for computing a d-axis feed-forward voltage command value E1DFF and a q-axis feed-forward voltage command value E1QFF by using the d-axis current command value IDR, the q-axis current command value IQR, the induction motor constant and the inverter angular frequency ωinv; a feed-forward voltage vector computing means for computing a feed-forward voltage command value E1F by computing a square root value of a square sum of the d-axis feed-forward voltage command value E1DFF and the q-axis feed-forward voltage command value E1QFF; a feedback current computing means for computing a d-axis feedback current IDF and a q-axis feedback current IQF from a three-phase current value of the induction motor; a compensation voltage computing means for computing a d-axis compensation voltage E1DFB from a difference between the d-axis current command value IDR and the d-axis feedback current IDF, and for computing a q-axis compensation voltage E1QFB from a difference between the q-axis current command value IQR and the q-axis feedback current IQF; a dq-axis voltage command value computing means for computing a d-axis voltage command value E1DR by adding the d-axis compensation voltage E1DFB and the d-axis feed-forward voltage command value E1DFF, and for computing a q-axis voltage command value E1QR by adding the q-axis compensation voltage E1QFB and the q-axis feed-forward voltage command value E1QFF; a voltage vector computing means for determining a voltage command value E1R by computing a square root value of a square sum of each of the d-axis voltage command value E1DR and the q-axis voltage command value E1QR; and a secondary resistance correction value computing means for adjusting a correction value ΔR2 of a secondary resistance so that a difference between the feed-forward voltage command value E1F and the voltage command value E1R becomes zero. In the vector controller for induction motor of the present invention, the vector control command computing means employs an induction motor constant that has been corrected by the correction value ΔR2 of the secondary resistance to compute the slip angular frequency command value ωs* to thereby conduct vector control of the induction motor.

Alternatively, the vector controller of the persent invention may be provided with a slip angular frequency correction value computing unit 30 in place of the secondary resistance correction value computing unit.

BRIEF DESCRIPTION OF THE DRAWINGS

The present invention will become more readily apparent from the following detailed description of the preferred embodiments of the present invention taken in conjunction with th accompanying drawings, in which.

DESCRIPTION OF THE PREFERRED EMBODIMENTS

The following will describe embodiments of the present invention.

First Embodiment

Figure 1:
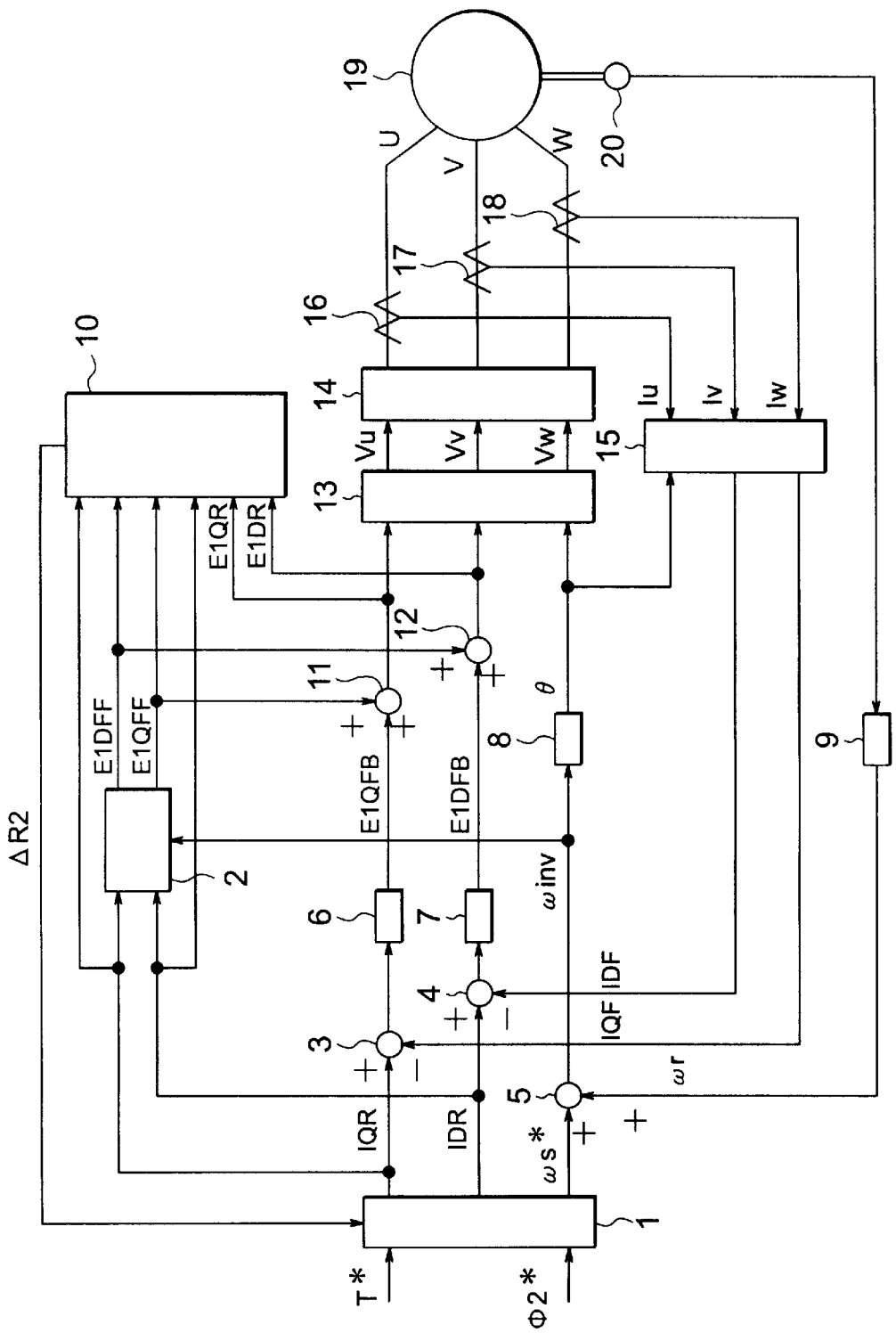
FIG. 1 is a block diagram showing a configuration of a vector controller for an induction motor according to a first embodiment of the present invention.

FIG. 1 is a block diagram showing a vector controller for an induction motor in accordance with a first embodiment of the present invention. A vector control command computing unit 1 shown in FIG. 1 calculates a torque current command value (q-axis current command value) IQR, a magnetic flux current command value (d-axis current command value) IDR, and a slip angular frequency command value ωs* based on a torque command value T*, a secondary magnetic flux command value Φ2*, a secondary resistance correction value ΔR2, and an induction motor constant of an induction motor 19 to be controlled. A feed-forward (hereinafter referred to as "F.F.") voltage computing unit 2 calculates a q-axis feed-forward voltage command value E1QFF and a d-axis feed-forward voltage command value E1DFF based on the torque current command value IQR, the magnetic flux current command value IDR, and an inverter angular frequency ωinv. The inverter angular frequency ωinv will be discussed hereinafter.

A first subtracter 3 determines a difference ΔIQ between the torque current command value IQR and a torque feedback current IQF which will be discussed hereinafter. A second subtracter 4 determines a difference ΔID between the magnetic flux current command value IDR and a magnetic flux feedback current IDF which will be discussed hereinafter. A first adder 5 adds a revolution angular frequency ωr of the induction motor to the slip angular frequency command value ωs* and outputs the inverter angular frequency ωinv.

A first constant current compensating unit 6 receives the difference ΔIQ and outputs a compensation voltage E1QFB, a second constant current compensating unit 7 receives the difference ΔID and outputs a compensation voltage E1DFB, and an integrator 8 integrates the inverter angular frequency ωinv and decides a phase θ on d-q coordinates. An angular frequency computing unit 9 converts an output pulse signal of a pulse generator 20, which will be described later, into the revolution angular frequency ωr of the induction motor.

A secondary resistance correction value computing unit 10 computes the secondary resistance correction value ΔR2 based on the d-axis F.F. voltage command value E1DFF, the q-axis F.F. voltage command value E1QFF, the torque current command value IQR, the magnetic flux current command value IDR, and voltage command values E1QR and E1DR which will be discussed later. A second adder 11 adds the q-axis F.F. voltage command value E1QFF and the compensation voltage E1QFB, and outputs the voltage command value E1QR, and a third adder 12 adds the d-axis F.F. voltage command value E1DFF and the compensation voltage E1DFB, and outputs the voltage command value E1DR.

A first coordinate converting unit 13 performs conversion into three-phase voltage command values Vu, Vv, and Vw from the d- and q-axis voltage command values E1QR and E1DR represented on a d-q coordinate system, and phase θ of the d-q coordinate system. A pulse width modulation inverter 14 applies a commanded voltage to the induction motor 19 based on the three-phase voltage command values Vu, Vv, and Vw. A second coordinate converting unit 15 performs conversion into the q-axis feedback current IQF and the d-axis feedback current IDF on the d-q coordinates from three-phase currents Iu, Iv, and Iw, and phase θ. A first current detector 16 detects a U-phase current, a second current detector 17 detects a V-phase current, and a third current detector 18 detects a W-phase current. The induction motor 19 is an object to be controlled in vector, and the pulse generator 20 detects a number of revolutions of the induction motor 19.

An operation will now be described. The vector control command computing unit 1 employs the torque command T*, the secondary magnetic flux command Φ2*, circuit constants of the induction motor 19, and an output ΔR2 of the secondary resistance correction value computing unit 10 to compute the torque current command value IQR, the magnetic flux current command value IDR, and the slip angle frequency command value ωs* according to expressions (9) through (11) shown below:

$$IQR = \frac{T^*}{\Phi 2^*} \times \frac{1}{P} \times \frac{L2^*}{M^*} \quad (9)$$

$$IDR = \frac{\Phi 2^*}{M^*} \quad (10)$$

$$\omega s^* = \frac{IQR}{IDR} \times \frac{(R2^* + \Delta R2)}{L2^*} \quad (11)$$

where

P: Number of pairs of poles of motor
M*: Set value of mutual inductance of motor (H)
L2*: Set value of secondary self inductance of motor (H)
R2*: Set value of secondary resistance of motor (Ω)

The asterisks (*) attached to the circuit constants M, L2, and R2 of the induction motor in the above expressions (9) through (11) denote nominal values or set values.

The slip angular frequency command value ωs* determined by the vector control command computing unit 1 is added to the inductor motor revolution angular frequency ωr in the first adder 5 to compute the inverter angular frequency ωinv.

The F.F. computing unit 2 receives the torque current command value IQR, the magnetic flux current command value IDR, and the inverter angular frequency ωinv, and computes the q-axis F.F. voltage command value E1QFF and the d-axis F.F. voltage command value E1DFF according to the following expressions (12) and (13).

$$E1QFF = R1^* \times IQR + \omega inv \times L1^* \times IDR \quad (12)$$

$$E1DFF = R1^* \times IDR - \omega inv \times L1^* \times \sigma \times IQR \quad (13)$$

where

R1*: Set value of primary resistance of motor (Ω)
L1*: Primary self inductance of motor (H)
σ: Leakage coefficient (=1−M*²/(L1*×L2*))

Based on the difference ΔIQ, which is an output of the first subtracter 3, the first constant current compensating unit 6 outputs a compensation voltage E1QFB so that the q-axis feedback current IQF coincides with the torque current command value IQR. Likewise, based on the difference ΔID, which is an output of the second subtracter 4, the second constant current compensating unit 7 outputs a compensation voltage E1DFB that causes the d-axis feedback current IDF to coincide with the magnetic flux current command value IDR.

The second adder 11 adds the q-axis F.F. voltage command value E1QFF and the compensation voltage E1QFB to obtain the voltage command value E1QR. Similarly, the third adder 12 adds the d-axis F.F. voltage command value E1DFF and the compensation voltage E1DFB to obtain the voltage command value E1DR.

The first coordinate converting unit 13 is a coordinate converting unit that converts the voltage command values E1QR and E1DR into the three-phase voltage command values Vu, Vv, and Vw, and it performs computation according to the following expression (14), where θ denotes a phase of a d-q coordinate system computed by the integrator 8 as described above.

$$\begin{pmatrix} Vu \\ Vv \\ Vw \end{pmatrix} = \sqrt{\frac{2}{3}} \begin{pmatrix} \cos\theta & \sin\theta \\ \cos\left(\theta - \frac{2}{3}\pi\right) & \sin\left(\theta - \frac{2}{3}\pi\right) \\ \cos\left(\theta - \frac{4}{3}\pi\right) & \sin\left(\theta - \frac{4}{3}\pi\right) \end{pmatrix} \begin{pmatrix} E1QR \\ E1DR \end{pmatrix} \quad (14)$$

The pulse width modulation inverter 14 carries out pulse width modulation control based on the three-phase voltage commands Vu, Vv, and Vw, and applies a commanded voltage to drive the induction motor 19.

The second coordinate converting unit 15 is a coordinate converting unit that converts the three-phase currents Iu, Iv, and Iw detected by the current detectors 16, 17, and 18, respectively, into the currents IQF and IDF on the d-q coordinates by employing phase θ of the d-q coordinate system, and performs computation according to the following expression (15).

$$\begin{pmatrix} IQF \\ IDF \end{pmatrix} = \sqrt{\frac{2}{3}} \begin{pmatrix} \cos\theta & \cos\left(\theta - \frac{2}{3}\pi\right) & \cos\left(\theta - \frac{4}{3}\pi\right) \\ \sin\theta & \sin\left(\theta - \frac{2}{3}\pi\right) & \sin\left(\theta - \frac{4}{3}\pi\right) \end{pmatrix} \begin{pmatrix} Iu \\ Iv \\ Iw \end{pmatrix} \quad (15)$$

This completes the description of the operation of the entire system. The principle of operation of the secondary resistance correction value computing unit 10 will now be described.

In an ideal state wherein all constants of the induction motor set by the vector control and all actual constants of the induction motor agree with each other, the compensation voltages E1QFB and E1DFB, which are outputs of the constant current compensating units 6 and 7, respectively, are zero. In other words, disagreement of the constants of the induction motor causes E1QFB and E1DFB to take non-zero values. This means that an ideal vector control state can be maintained by monitoring magnitudes of the compensation voltages E1QFB and E1DFB of the d-axis and q-axis and by adjusting the induction motor constant set by the vector control command computing unit 1 so that the values of the compensation voltages become zero.

A relationship between the induction motor constants and vector control performance will now be discussed. In the vector control, the resistance values, the self inductances, and mutual inductances of the primary and the secondary, respectively, are set as the induction motor constants. The self inductances and the mutual inductances of the primary and the secondary scarcely change with temperature changes. Therefore, it can be considered that a resistance value changes with an operating condition of the induction motor.

Furthermore, of resistance values, a setting error of a primary resistance value hardly influences the compensation voltages E1QFB and E1DFB in a region wherein output voltages of the induction motor are high, and an output torque exerts more influences due to a setting error of a secondary resistance value than a setting error of a primary resistance value. For this reason, there should be no problem in considering that the foregoing compensation voltage outputs correspond to deviations of actual secondary resistance values from the secondary resistance values set by the controller.

Figure 2:
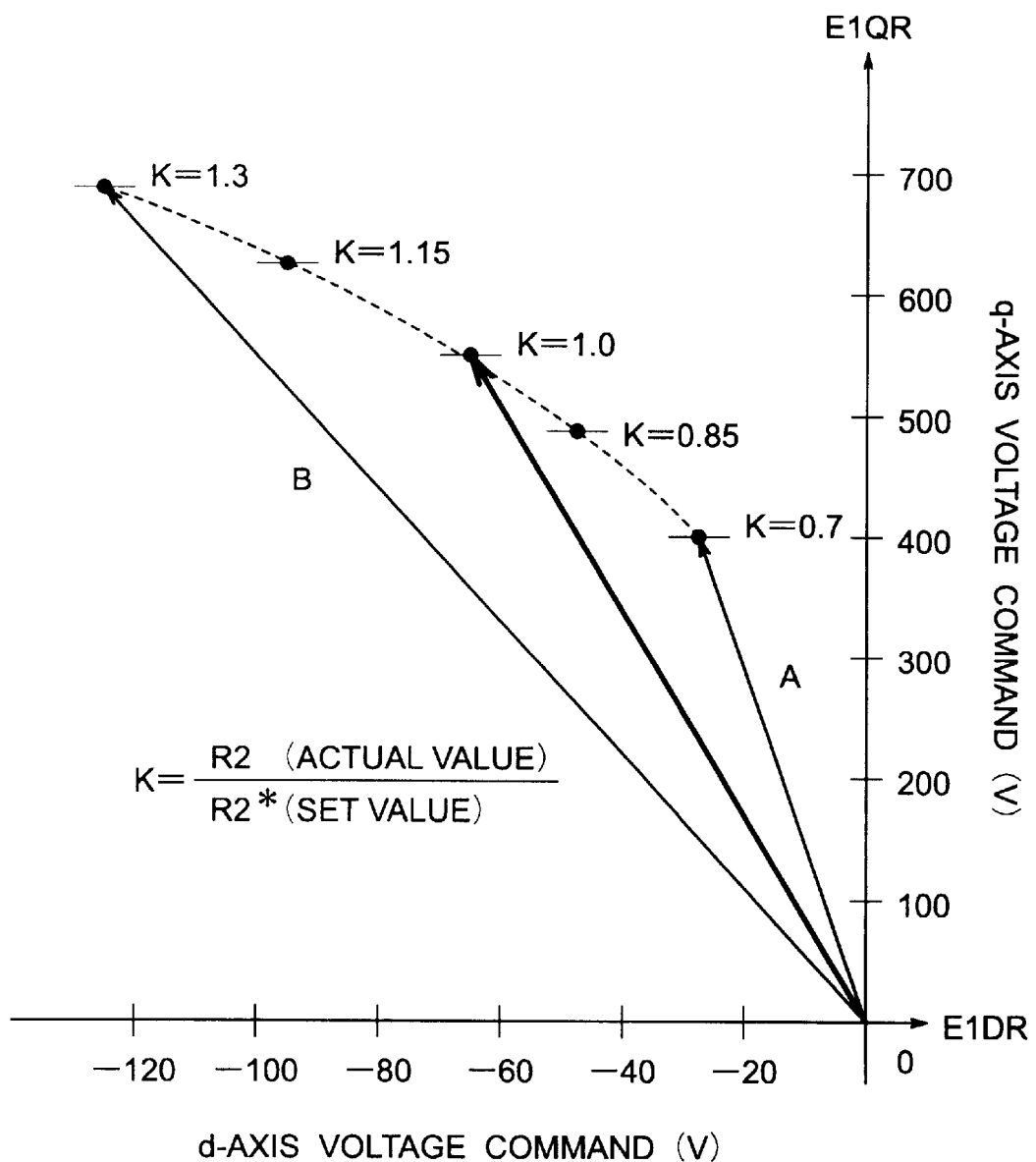
FIG. 2 is a graph showing a principle of operation of the vector controller for an induction motor according to the first embodiment of the present invention.

FIG. 2 shows changes in voltage vector when the d- and q-axis voltage commands E1DR and E1QR represented by vector when the secondary resistance set by the controller differs from an actual secondary resistance of the induction motor, Ratio K is defined by expression (16) shown below.

$$K = R2/R2^* \quad (16)$$

where

R2: Secondary resistance value (actual value) of motor (Ω)

R2*: Secondary resistance value set at controller (Ω)

If K=1.0, that is, the secondary resistance value R2 of the induction motor agrees with the secondary resistance value R2* set at the controller, then the voltage is indicated by a voltage vector shown by a thick-line arrow in FIG. 2. In this state, the compensation voltages E1QFB and E1DFB become zero as previously mentioned. Thus, a voltage command at this time is decided only by the F.F. voltage command values E1QFF and E1DFF. If the magnitude of the voltage command is defined as VPF, then VPF is determined by the following expression (17).

$$VPF = \sqrt{E1DFF^2 + E1QFF^2} \quad (17)$$

Descriptions will now be given of a case where the secondary resistance value of the induction motor is smaller than a set secondary resistance value of the controller, e.g., K=0.7. In this state, a slip frequency is set to a large value, so that a feedback current will be large with respect to a current command value. As a result, an operation of the constant current compensating units 6 and 7 makes a correction to reduce the voltage commands E1QR and E1DR. The voltage vector at that time is indicated by A of FIG. 2. If the magnitude of the voltage is defined as VPA, then VPA is determined by the following expression (18):

$$VPA = \sqrt{(E1DFF + E1DFB)^2 + (E1QFF + E1QFB)^2} + \sqrt{\sqrt{E1DR^2 E1QR^2}}(18)$$

Referring to FIG. 2, the magnitude of the voltage vector under this condition can be represented by a relationship of the following expression (19):

$$VPF > VPA \quad (19)$$

If the secondary resistance value of the induction motor is larger than a set secondary resistance value of the controller, e.g., K=1.3, then the opposite situation from that in the case of K=0.7 occurs, and the voltage vector will be as indicated by B of FIG. 2. If the magnitude of the voltage vector at that time is defined as VPB, then a relationship between VPB and VPF is represented by the following expression (20) when the same rule as the above applies.

$$VPF < VPB \quad (20)$$

The foregoing relationships may be summarized as shown below.

If $R2 < R2^*$, then $VPA < VPF$.

If $R2 > R2^*$, then $VPB > VPF$.

Figure 3:
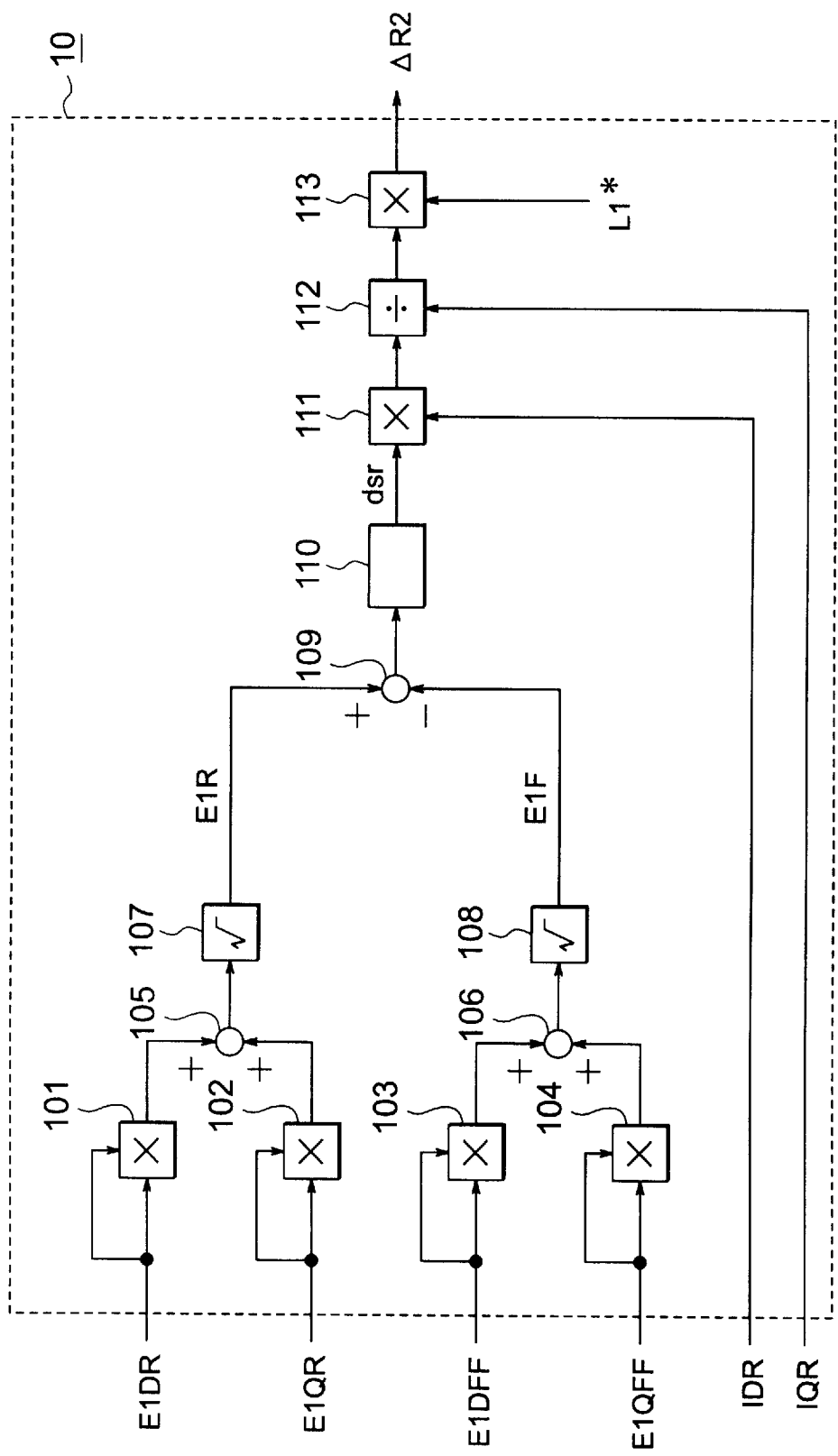
FIG. 3 is a block diagram showing a configuration of a secondary resistance correction value computing unit provided in the vector controller for an induction motor according to the first embodiment of the present invention.

The secondary resistance correction value computing unit 10 calculates the secondary resistance correction value ΔR2 according to the principle of operation described above. FIG. 3 shows an internal configuration of the secondary resistance correction value computing unit 10.

Referring to FIG. 3, first through fourth multipliers 101 through 104 compute square values of the d- and q-axis voltage command values E1DR and E1QR, and the d- and q-axis F.F. voltage command values E1DFF and E1QFF. A fourth adder 105 adds the square values of the d- and q-axis voltage command values E1DR and E1QR, and a fifth adder 106 adds the square values of the d- and q-axis F.F. voltage command values E1DFF and E1QFF. A first computing unit 107 computes a square root E1R of the square sum of the d- and q-axis voltage command values E1DR and E1QR, and a second computing unit 108 computes a square root E1F of the square sum of the d- and q-axis F.F. voltage command values E1DFF and E1QFF. A third subtracter 109 subtracts E1F from E1R to compute a voltage deviation ΔE1, and a control unit 110 computes a correction value dsr that causes the voltage deviation ΔE1 to become zero. A fifth multiplier 111 multiplies the correction value dsr by the magnetic flux current command value IDR. A first divider 112 divides a computation result of the fifth multiplier 111 by the torque current command value IQR. A sixth multiplier 113 multiplies a computation result of the first divider 112 by the induction motor constant L1* to compute the secondary resistance correction value ΔR2.

An operation of the secondary resistance correction value computing unit 10 will now be described. The secondary resistance correction value computing unit 10 receives the d- and q-axis F.F. voltage command values E1DFF and E1QFF, the d- and q-axis voltage command values E1DR and E1QR, the torque current command value IQR, and the magnetic flux current command value IDR, and computes E1F, which is a square root value of the square sum of E1DFF and E1QFF as shown in FIG. 3. Similarly, the secondary resistance correction value computing unit 10 computes E1R, which is a square root value of the square sum of E1DR and E1QR. The third subtracter 109 subtracts E1F from E1R to compute the voltage deviation ΔE1 and supplies the computed ΔE1 to the first control unit 110. The first control unit 110 computes the correction value dsr that reduces the voltage deviation ΔE1 to zero. At this time, the torque current command value IQR and the magnetic flux current command value IDR, which have been computed in the vector control command computing unit 1 according to expressions (9) and (10), and a primary self inductance set value L1* of the induction motor are employed to calculate the secondary resistance correction value ΔR2, then the calculation result is supplied to the vector control command computing unit 1.

The vector control command computing unit 1 employs the secondary resistance correction value ΔR2 to compute the slip angular frequency command value ωs* according to expression (11).

As the control unit 110, a proportional integrator is usually used; however, an integrating computing unit is adequate because changes in the secondary resistance caused by temperature changes are relatively dull.

Thus, according to the vector controller for an induction motor in this embodiment shown in FIG. 1, the secondary resistance correction value ΔR2 is calculated by the secondary resistance correction value computing unit 10, and the slip angular frequency command value ωs* is calculated by the vector control command computing unit 1 according to expression (11). This arrangement enables the secondary resistance, which is set by the vector control, to be automatically adjusted even if the secondary resistance varies with temperature changes in the induction motor 19 to be controlled. Hence, even in a vector controller with or without velocity commands or in an application wherein velocity commands are not step-changed during operation, the secondary resistance can be corrected by a simple method using internal control signals, obviating the need for any special signals for adjusting the secondary resistance. This allows a good vector control state to be maintained regardless of the temperature of the induction motor. Thus, by compensating a secondary resistance according to temperature changes, it is possible to make a motor output torque agree with a command value and to maintain quick torque responsiveness.

Second Embodiment

Figure 4:
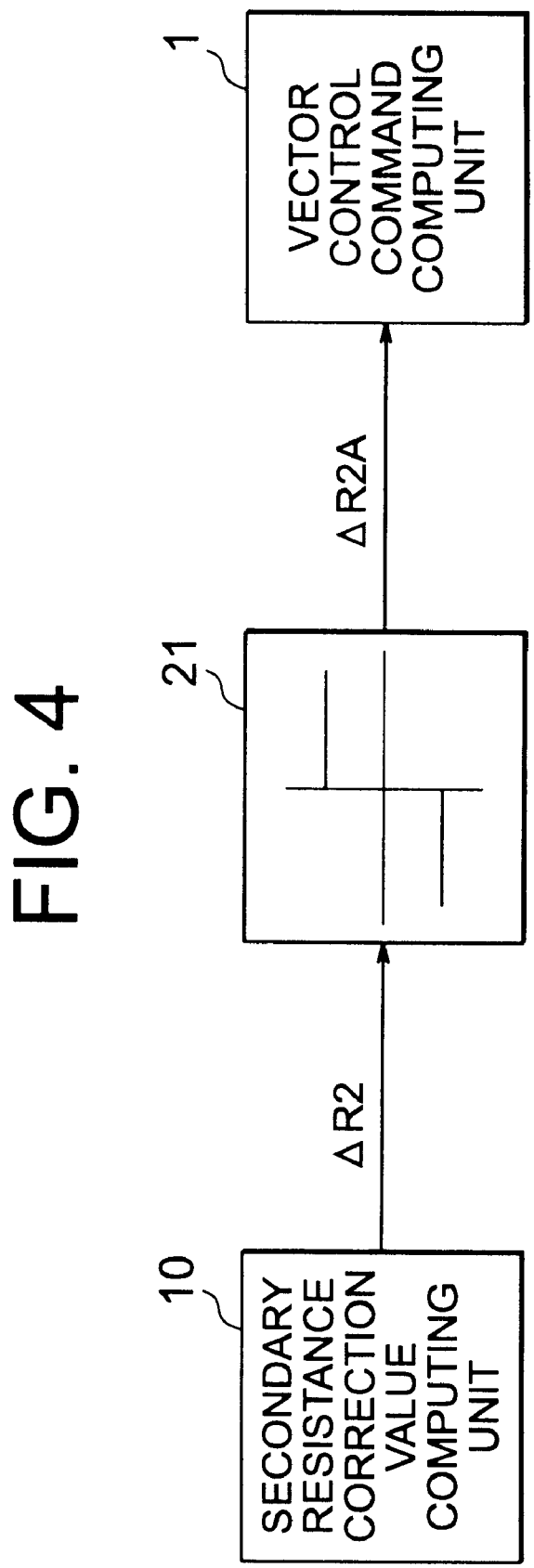
FIG. 4 is a partial block diagram showing a configuration of a vector controller for an induction motor according a second embodiment of the present invention.

FIG. 4 is a partial block diagram showing a configuration of a vector controller for an induction motor according to a second embodiment of the present invention. FIG. 4 shows only a structural part that is different from the configuration shown in FIG. 1, the same structural part being omitted in the drawing. In the vector controller shown in FIG. 1, the secondary resistance correction value ΔR2 computed by the secondary resistance correction value computing unit 10 is supplied to the vector control command computing unit 1. The vector controller in this embodiment shown in FIG. 4 is provided with a limiter that limits the magnitude of the secondary resistance correction value ΔR2 so as to supply a second secondary resistance correction value ΔR2A that has been restricted by the limiter to the vector control command computing unit 1.

Referring to FIG. 4, a first limiter 21 limits the secondary resistance correction value ΔR2 and outputs the second secondary resistance correction value ΔR2A. More specifically, the vector controller shown in FIG. 4 has added the first limiter 21 located between the secondary resistance correction value computing unit 10 and the vector control command computing unit 1 of the vector controller shown in FIG. 1.

An operation of the second embodiment will now be described. The first limiter 21 receives the secondary resistance correction value ΔR2. A maximum value ΔR2max and a minimum value ΔR2min of the secondary resistance correction value used by the vector control command computing unit 1 are preset at the first limiter 21.

If the secondary resistance correction value ΔR2 supplied is larger than the maximum value ΔR2max, then the ΔR2max of the secondary resistance correction value is output as the second secondary resistance correction value ΔR2A.

If the secondary resistance correction value ΔR2 supplied is smaller than the minimum value ΔR2min, then the ΔR2min of the secondary resistance correction value is output as the second secondary resistance correction value ΔR2A.

It is obvious that, if the secondary resistance correction value ΔR2 supplied is smaller than the maximum value ΔR2max and larger than the minimum value ΔR2min of the secondary resistance correction value, then the secondary resistance correction value ΔR2 supplied is output as it is as the second secondary resistance correction value ΔR2A.

The vector control command computing unit 1 employs the second secondary resistance correction value ΔR2A in place of the secondary resistance correction value ΔR2 to perform computation according to expression (11) so as to obtain the slip angular frequency command value ωs*. The rest of the operation is identical to that of the first embodiment described above, and therefore it will not be repeated.

Thus, in the vector controller of this embodiment illustrated in FIG. 4, a value of the second secondary resistance correction value ΔR2A supplied to the vector control command computing unit 1 is limited by the limiter 21 to a range from ΔR2min to ΔR2max. This makes it possible to prevent the secondary resistance correction value ΔR2 from taking a value that is impossible in an operating range due to, for example, a computation error, and to prevent a resultant malfunction.

Third Embodiment

Figure 5:
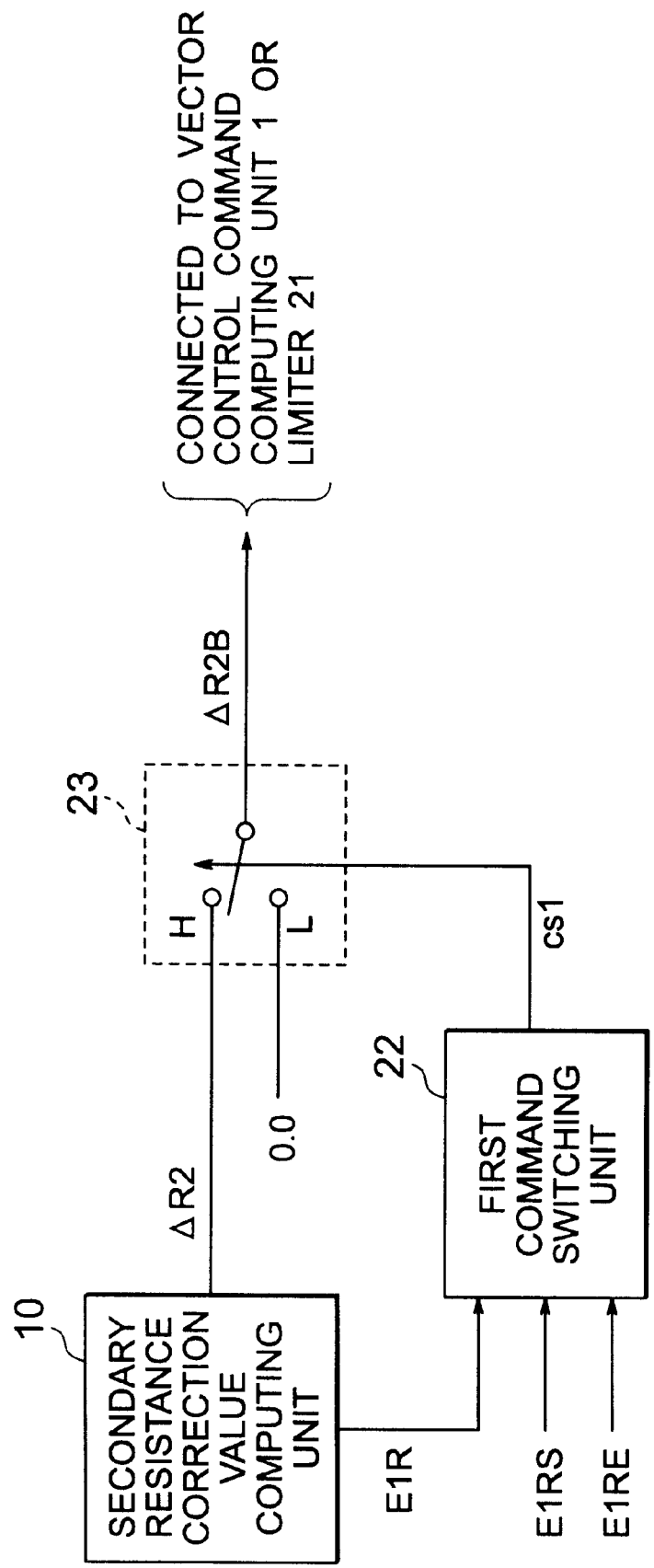
FIG. 5 is a partial block diagram showing a configuration of a vector controller for an induction motor according a third embodiment of the present invention.

FIG. 5 is a partial block diagram showing a configuration of a vector controller for an induction motor according to a third embodiment of the present invention. In the vector controller shown in FIGS. 1 and 4 discussed above, the secondary resistance correction value ΔR2 is calculated by the secondary resistance correction value computing unit 10, while the vector controller of the embodiment shown in FIG. 5 sets the secondary resistance correction value ΔR2 according to the magnitude of the voltage command value E1R.

Referring to FIG. 5, a first command switching unit 22 receives the voltage command value E1R, a secondary resistance correction start voltage E1RS, and a secondary resistance correction end voltage E1RE, and outputs a switching signal cs1. A first selector switch 23 selects the secondary resistance correction value ΔR2 or zero according to the switching signal cs1 from the first command switching unit 22. In this case, the secondary resistance correction start voltage E1RS and the secondary resistance correction end voltage E1RE may be preset to appropriate predetermined values, or set by a user or the like to predetermined values as necessary. The configuration of the vector controller shown in FIG. 5 can be applied to the vector controller shown in FIG. 1 or FIG. 4 described above.

An operation of the vector controller shown in FIG. 5 will now be described. The first command switching unit 22 compares the voltage E1R calculated by the secondary resistance correction value computing unit 10 with the secondary resistance correction start voltage E1RS and the secondary resistance correction end voltage E1RE, and outputs the switching signal cs1 at a low level (L) or a high level (H) according to a logic shown below.

E1RS≦E1R≦E1RE: cs1=H

Others: cs1=L

The first selector switch 23 receives the switching signal cs1 from the first command switching unit 22, and sets a second secondary resistance correction value ΔR2B to zero when the switching signal cs1 is at the low level (L) or sets the secondary resistance correction value ΔR2 calculated by the secondary resistance correction value computing unit 10 as the second secondary resistance correction value ΔR2B when the switching signal cs1 is at the high level (H). The secondary resistance correction value ΔR2B is output to the vector control command computing unit 1 (FIG. 1) when this embodiment is applied to the configuration shown in FIG. 1, or to the limiter 21 (FIG. 4) when the embodiment is applied to the configuration shown in FIG. 4. The rest of the operation is identical to that of the vector controller shown in FIG. 1, and the description thereof will be omitted.

Thus, in the vector controller of the embodiment shown in FIG. 5, the second secondary resistance correction value ΔR2B supplied to the vector control command computing unit 1 can be set to either the secondary resistance correction value ΔR2 computed by the secondary resistance correction value computing unit 10 or zero according to the magnitude of the voltage command E1R. This arrangement makes it possible to set an operation range in which the secondary resistance should be corrected or not. For example, the computation for the secondary resistance correction can be avoided in an area wherein a value of the voltage command E1R is small and the secondary resistance correction value ΔR2 is apt to incur a large error due to a primary resistance setting error or the like (i.e., if the voltage command E1R is smaller than the value of E1RS).

Fourth Embodiment

Figure 6:
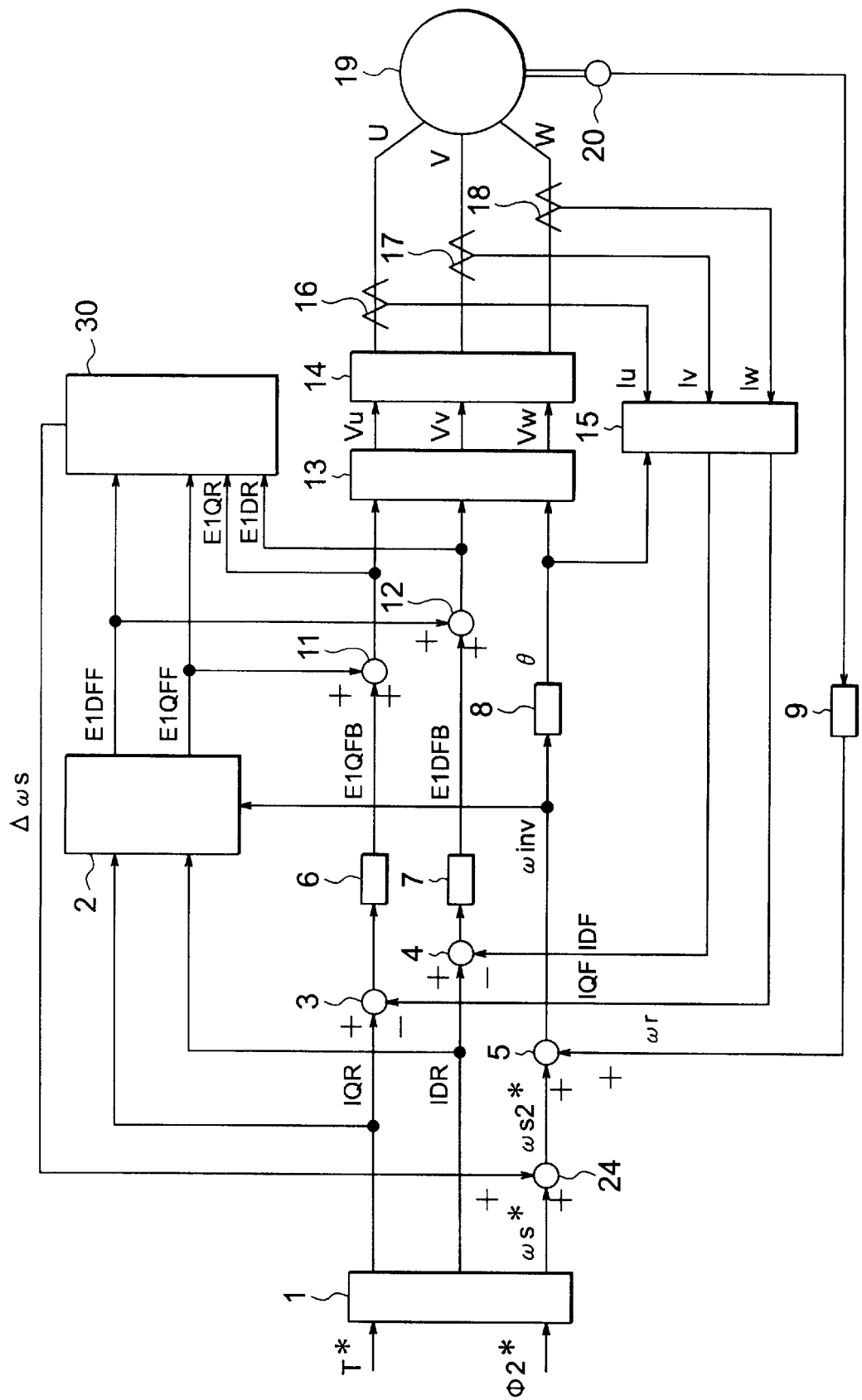
FIG. 6 is a block diagram showing a configuration of a vector controller for an induction motor according to a fourth embodiment of the present invention.

FIG. 6 shows a configuration of a vector controller for an induction motor according to a fourth embodiment of the present invention. In the vector controller shown in FIGS. 1, 4, and 5 described above, the secondary resistance correction value ΔR2 is computed by the secondary resistance correction value computing unit 10, and the slip angular frequency command value ωs* is computed using expression (11) by the vector control command computing unit 1. The vector controller of this embodiment shown in FIG. 6 is provided with a slip angular frequency correction value computing unit 30 in place of the secondary resistance correction value computing unit 10. A slip angular frequency correction value Δωs is calculated by the slip angular frequency correction value computing unit 30, and the slip angular frequency correction value Δωs is added to the slip angular frequency command value ωs*.

Referring to FIG. 6, the slip angular frequency correction value computing unit 30 calculates the slip angular frequency correction value Δωs based on the F.F. voltage command values E1QFF and E1DFF, and the voltage command values E1QR and E1DR. A sixth adder 24 adds the slip angular frequency correction value Δωs and the slip angular frequency command value ωs* calculated by the vector control command computing unit 1 to obtain a second slip angular frequency command value ωs2*. The rest of the configuration is identical to the configuration of the vector controller shown in FIG. 1.

Figure 7:
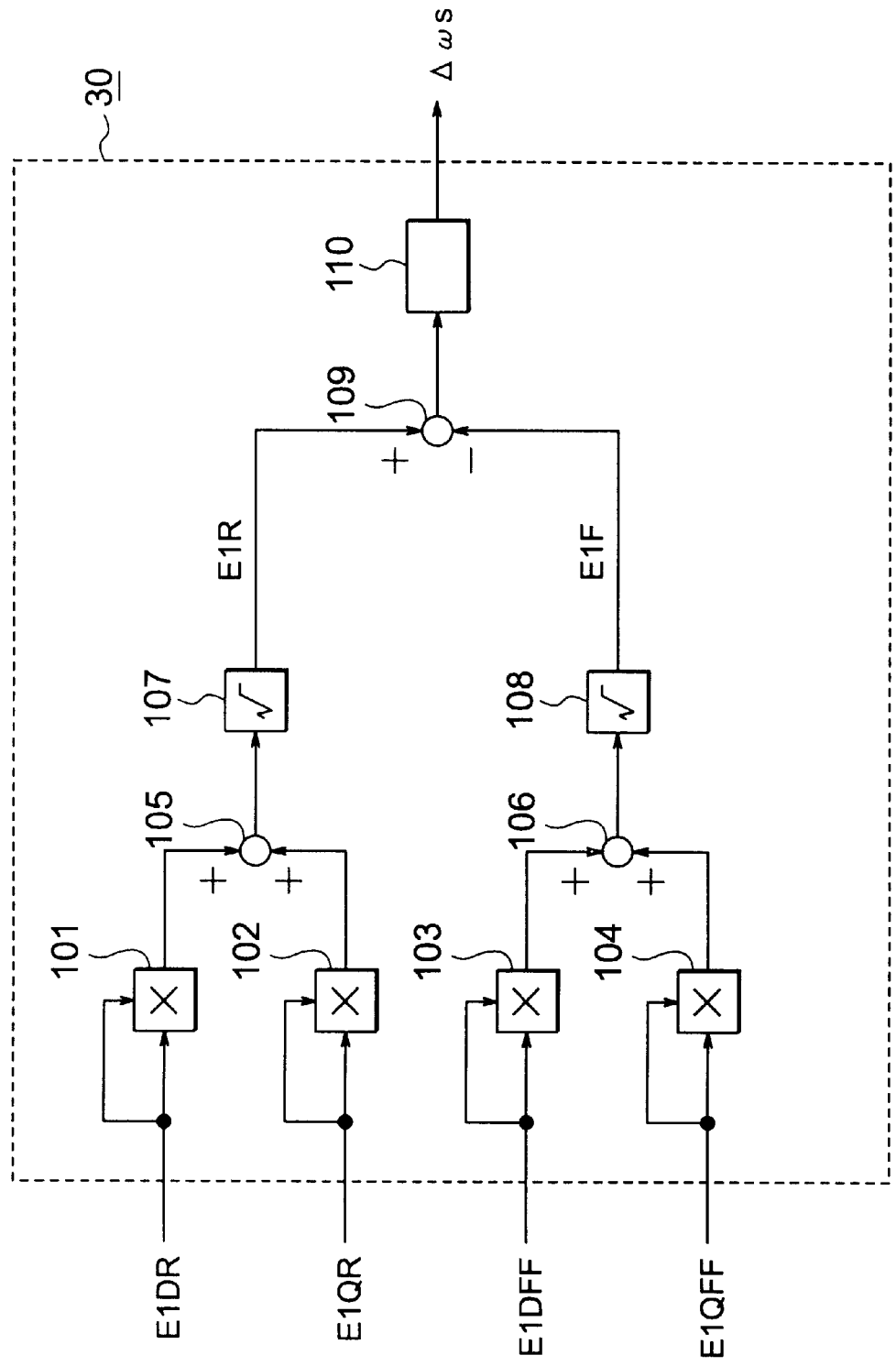
FIG. 7 is a block diagram showing a configuration of a slip angular frequency command correction value computing unit provided in the vector controller for an induction motor according to the fourth embodiment of the present invention.

FIG. 7 shows the configuration of the slip angular frequency correction value computing unit 30. As shown in FIG. 7, the slip angular frequency correction value computing unit 30 has the same configuration as that of a first stage section up to the control unit 110 of the secondary resistance correction value computing unit 10 shown in FIG. 3, and outputs a correction value dsr calculated by the secondary resistance correction value computing unit 10 as the slip angular frequency correction value Δωs without adding any changes.

An operation of the vector controller shown in FIG. 6 will now be described, focusing mainly on a part different from the vector controller shown in FIG. 1. The slip angular frequency correction value computing unit 30 computes E1R and E1F according to the same processing as that used by the secondary resistance correction value computing unit 10 shown in FIG. 3 to obtain a correction value that causes a deviation ΔE1 to become zero. The slip angular frequency correction value computing unit 30 outputs the correction value as the slip angular frequency correction value Δωs.

The sixth adder 24 adds the slip angular frequency correction value Δωs and the slip angular frequency command value ωs* computed by the vector control command computing unit 1 to obtain the second slip angular frequency command value ωs2*. The vector controller shown in FIG. 6 vector-controls an induction motor 19 according to the second slip angular frequency command value ωs2*.

Furthermore, the vector control command computing unit 1 calculates the slip angular frequency command value ωs* according to expression (11) mentioned above, ΔR2 being zero.

Thus, the vector controller of this embodiment shown in FIG. 6 calculates a change in the secondary resistance R2 as a slip angular frequency correction value to correct a slip angular frequency command value. Hence, performance as good as that of the vector controller shown in FIG. 1 can be achieved by a further simpler method without the need for directly computing the secondary resistance correction value.

Fifth Embodiment

Figure 8:
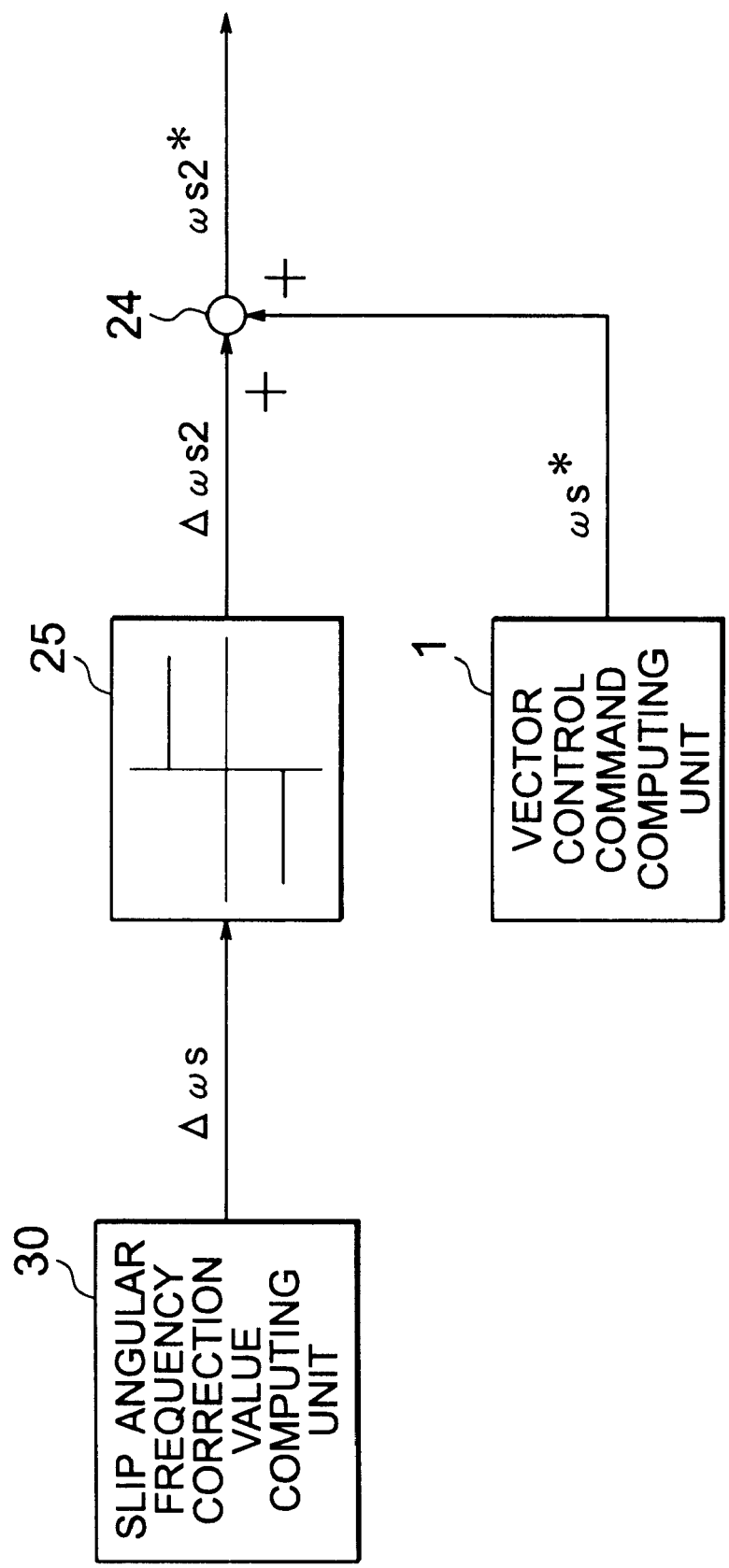
FIG. 8 is a partial block diagram showing a configuration of a vector controller for an induction motor according to a fifth embodiment of the present invention.

FIG. 8 shows a configuration of a vector controller for an induction motor according to a fifth embodiment of the present invention. The vector controller shown in FIG. 6 supplies the slip angular frequency correction value Δωs computed by the slip angular frequency correction value computing unit 30 to the sixth adder 24. The vector controller shown in FIG. 8 is provided with a limiter for restricting the magnitude of the slip angular frequency correction value Δωs, and a second slip angular frequency correction value Δωs2 limited by the limiter is output to the sixth adder 24.

Referring to FIG. 8, a limiter 25 restricts the slip angular frequency correction value Δωs, and outputs the second slip angular frequency correction value Δωs2. The configuration of the vector controller shown in FIG. 8 has added the limiter 25 installed between the slip angular frequency correction value computing unit 30 and the sixth adder 24 of the vector controller shown in FIG. 6.

An operation of the fifth embodiment will now be described. The limiter 25 receives the slip angular frequency correction value Δωs. A maximum value Δωsmax and a minimum value Δωsmin are set at the limiter 25.

If the slip angular frequency correction value Δωs supplied is larger than the maximum value Δωsmax, then the maximum value Δωsmax of the slip angular frequency correction value is output as the second slip angular frequency correction value Δωs2.

If the slip angular frequency correction value Δωs supplied is smaller than the minimum value Δωsmin, then the minimum value Δωsmin of the slip angular frequency correction value is output as the second slip angular frequency correction value Δωs2.

It is obvious that, if the slip angular frequency correction value Δωs supplied is smaller than the maximum value Δωsmax of the slip angular frequency correction value and larger than the minimum value Δωsmin of the slip angular frequency correction value, then the slip angular frequency correction value Δωs supplied is output as it is as the second slip angular frequency correction value Δωs2.

The sixth adder 24 adds the second slip angular frequency correction value Δωs2 in place of the slip angular frequency correction value Δωs, and a slip angular frequency command value ωs* calculated by the vector control command computing unit 1 so as to obtain a second slip angular frequency command value ωs2*.

Thus, in the vector controller of this embodiment illustrated in FIG. 8, a value of the slip angular frequency correction value Δωs is limited by the limiter 25. This makes it possible to prevent the slip angular frequency correction value Δωs from taking a value that is impossible in an operating range due to, for example, a computation error.

Sixth Embodiment

Figure 9:
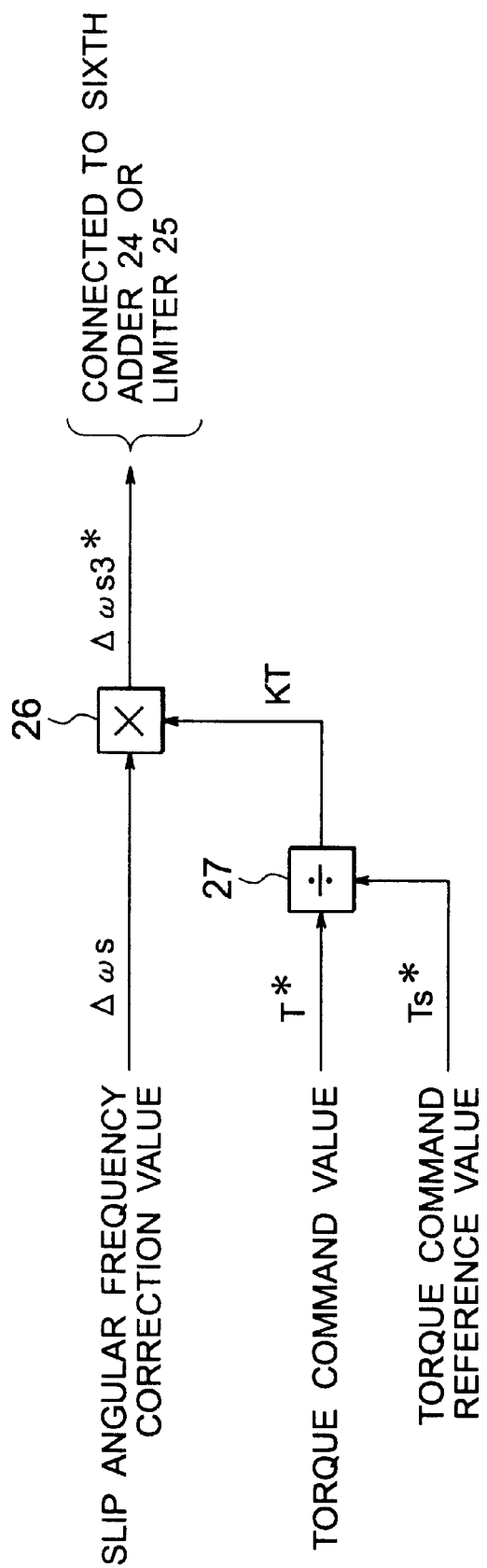
FIG. 9 is a partial block diagram showing a configuration of a vector controller for an induction motor according to a sixth embodiment of the present invention.

FIG. 9 is a partial block diagram showing a configuration of a vector controller for an induction motor according to a sixth embodiment of the present invention. In the vector controller shown in FIGS. 6 and 8 discussed above, the slip angular frequency correction value Δωs or Δωs2 supplied to the sixth adder 24 or the limiter 25 does not depend upon a torque command value T*. In the vector controller of this embodiment illustrated in FIG. 9, a third slip angular frequency correction value Δωs3* corrected by the torque command value is obtained, and the obtained value is supplied to the sixth adder 24 shown in FIG. 6 or the limiter 25 shown in FIG. 8.

Referring to FIG. 9, a fifth multiplier 26 multiplies the slip angular frequency correction value Δωs by a correction coefficient KT, and outputs the third slip angular frequency correction value Δωs3*. A second divider 27 divides the torque command value T* by a torque command reference value Ts*, and outputs the correction coefficient KT. The torque command reference value Ts* may be preset to a predetermined value or entered by a user or the like. The rest of the configuration of the vector controller shown in FIG. 9 is identical to the configuration of the vector controller shown in FIGS. 6 and 8. The functions of the vector controller shown in FIG. 9 can be applied to the vector controller shown in FIGS. 6 and 8.

An operation of the vector controller according to the sixth embodiment shown in FIG. 9 will now be described. A ratio of the torque command value T* to the torque command reference value Ts* is computed by the second divider 27, and the computation result is supplied as the correction coefficient KT to the fifth multiplier 26. The fifth multiplier 26 multiplies the slip angular frequency correction value Δωs by the correction coefficient KT, and supplies the multiplication result as the third slip angular frequency correction value Δωs3* to the sixth adder 24 or the limiter 25.

The sixth adder 24 adds the third slip angular frequency correction value Δωs3* in place of the slip angular frequency correction value Δωs, and a slip angular frequency command value frequency ωs* to obtain a second slip angular frequency command value frequency ωs2*. The limiter 25 receives the third slip angular frequency correction value Δωs3* in place of the slip angular frequency command correction value Δωs. The rest of the operation is identical to the operations of the fourth and fifth embodiments described above.

Thus, the vector controller of this embodiment shown in FIG. 9 computes the third slip angular frequency correction value Δωs3*, taking the torque command value T* into account. This arrangement makes it possible, for example, to prevent a delay in settling a slip angular frequency correction value caused by a response delay in the controller 110 shown in FIG. 7 when the torque command value T* changes during operation.

Seventh Embodiment

Figure 10:
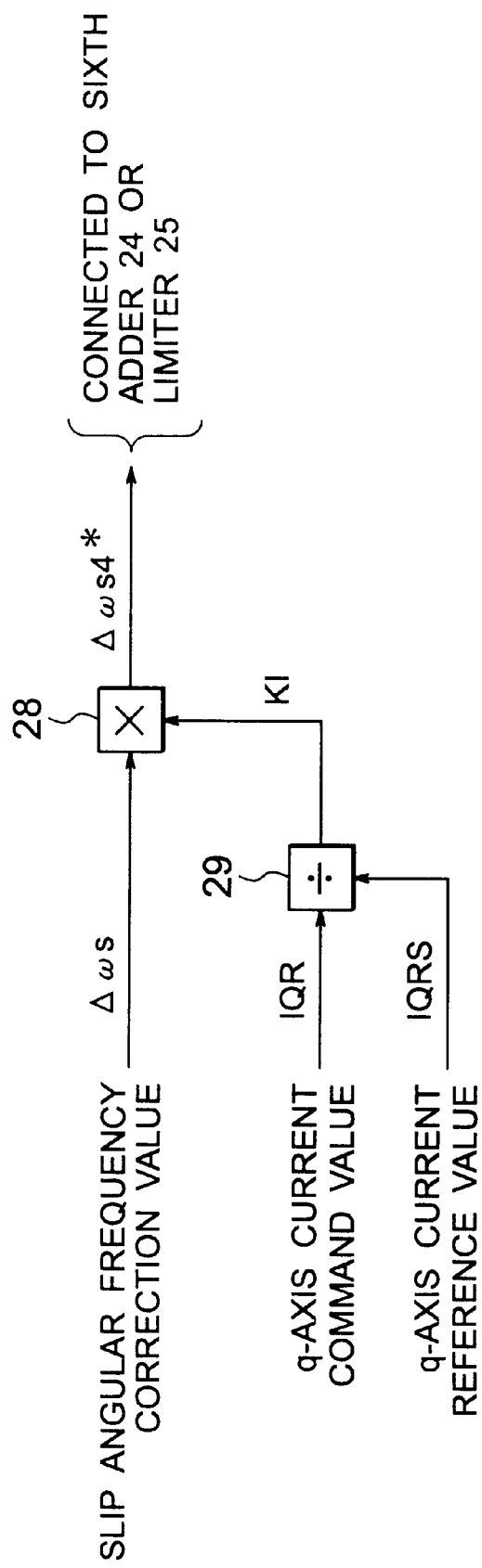
FIG. 10 is a partial block diagram showing a configuration of a vector controller for an induction motor according to a seventh embodiment of the present invention.

FIG. 10 is a partial block diagram showing a configuration of a vector controller according to a seventh embodiment of the present invention. The vector controller of FIG. 9 discussed above computes the correction coefficient KT by using the torque command value T*, while the vector controller of FIG. 10 employs a q-axis current command value IQR instead of the torque command value T* and establishes a q-axis current reference value IQRS instead of the torque command reference value Ts* to compute a correction coefficient KI.

Referring to FIG. 10, a sixth multiplier 28 multiplies the slip angular frequency correction value Δωs by a correction coefficient KI, and outputs a fourth slip angular frequency correction value Δωs4*. A third divider 29 divides the q-axis current command value IQR by the q-axis current reference value IQRS, and outputs the correction coefficient KI. The q-axis current reference value IQRS may be preset to a predetermined value or entered by a user or the like as necessary. The rest of the configuration of the vector controller shown in FIG. 10 is identical to the configuration of the vector controller shown in FIGS. 6 and 8. The functions of the vector controller shown in FIG. 10 can be applied to the vector controller shown in FIGS. 6 and 8.

An operation of the vector controller according to the seventh embodiment shown in FIG. 10 will now be described. A ratio of the q-axis current command value IQR to the q-axis current reference value IQRS is computed by the third divider 29, and the computation result is supplied as the correction coefficient KI to the sixth multiplier 28. The sixth multiplier 28 multiplies the slip angular frequency correction value Δωs by the correction coefficient KI, and supplies the multiplication result as the fourth slip angular frequency correction value Δωs4* to the sixth adder 24 or the limiter 25.

The sixth adder 24 adds the fourth slip angular frequency correction value Δωs4* in place of the slip angular frequency correction value Δωs, and a slip angular frequency command value frequency ωs* to obtain a second slip angular frequency command value frequency ωs2*. The limiter 25 receives the fourth slip angular frequency correction value Δωs4* in place of the slip angular frequency command correction value Δωs. The rest of the operation is identical to the operations of the fourth and fifth embodiments described above.

Thus, the vector controller of this embodiment shown in FIG. 10 computes the fourth slip angular frequency correction value Δωs4*, taking the q-axis current command value IQR into account. This arrangement makes it possible, for example, to prevent a delay in settling a slip angular frequency correction value caused by a response delay in the controller 110 shown in FIG. 7 when the q-axis current command value IQR changes during operation.

Eighth Embodiment

Figure 11:
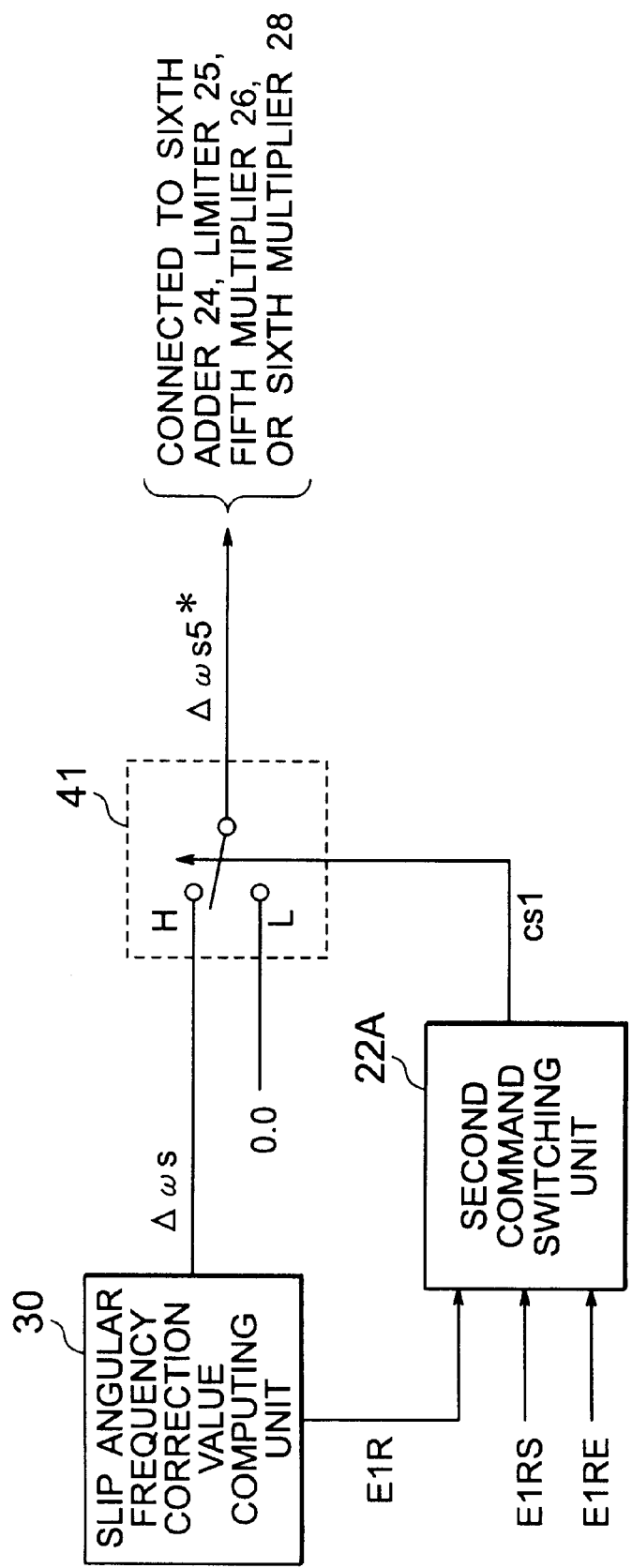
FIG. 11 is a partial block diagram showing a configuration of a vector controller for an induction motor according to an eighth embodiment of the present invention.
Figure 12:
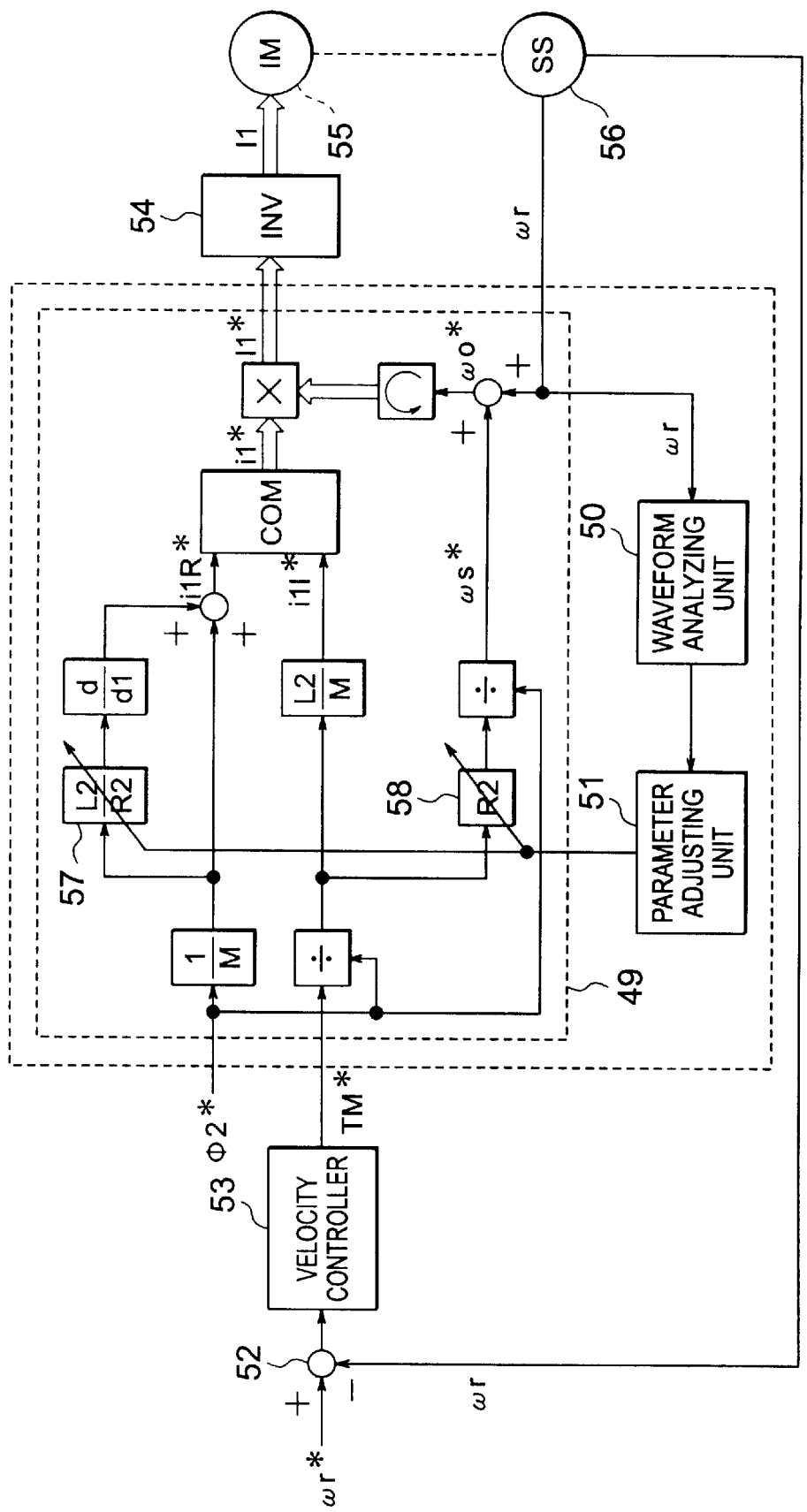
FIG. 12 is a block diagram showing a configuration of a known vector controller.
Figure 13:
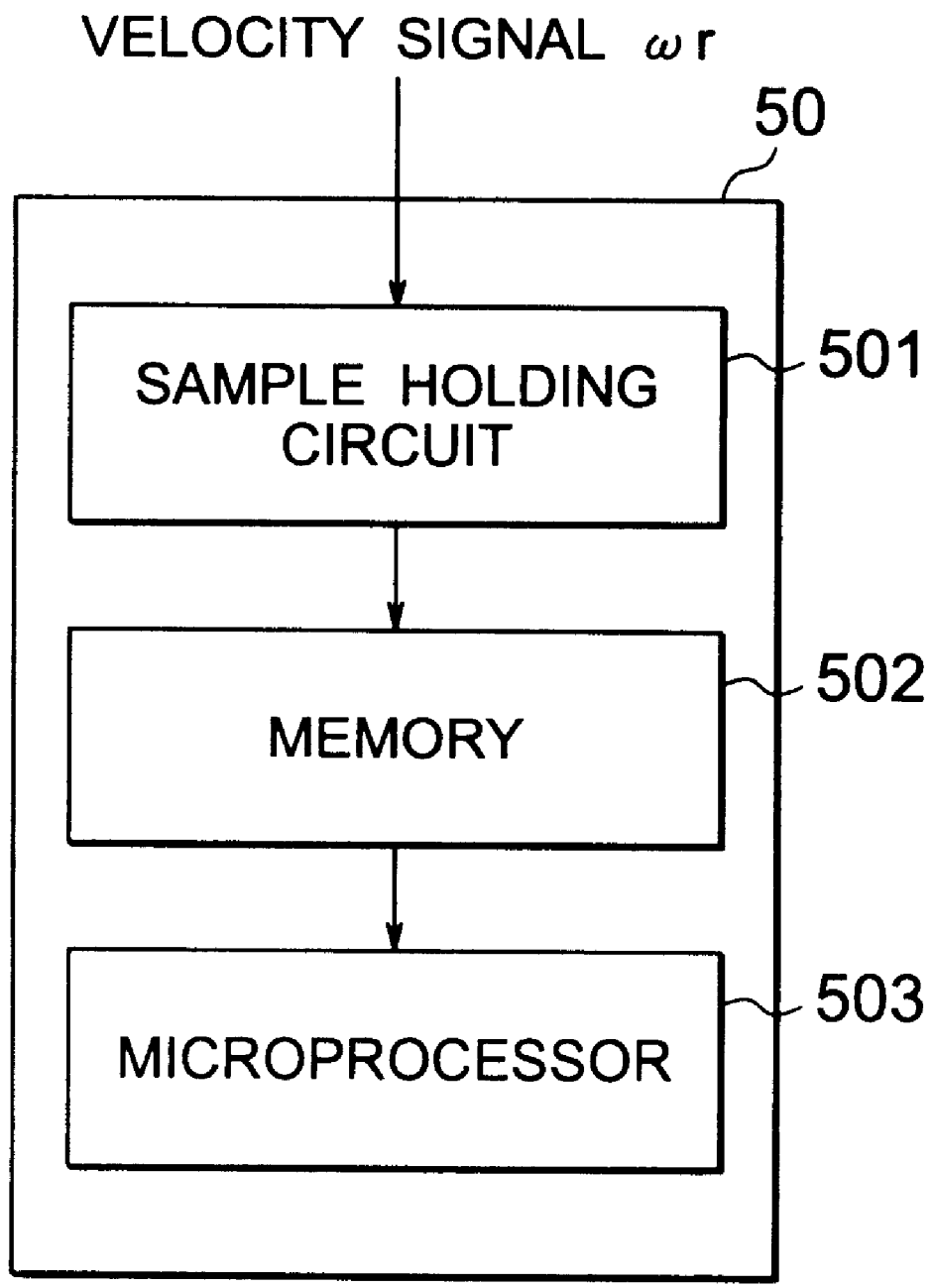
FIG. 13 is a block diagram showing a configuration of a waveform analyzer provided in the known vector controller.
Figure 14A:
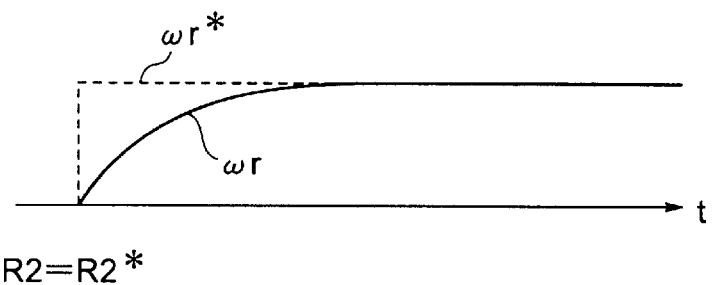
FIG. 14 is a graph showing simulation waveforms during an operation of the known vector controller.
Figure 14B:
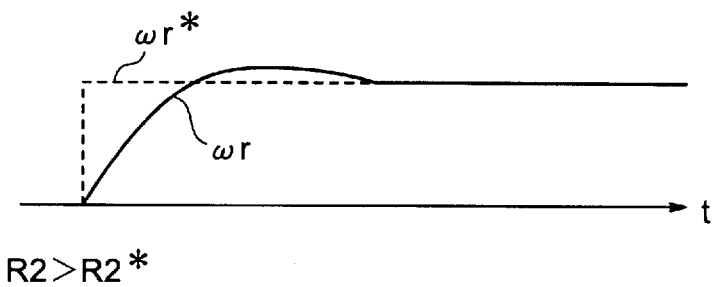
Figure 14C:
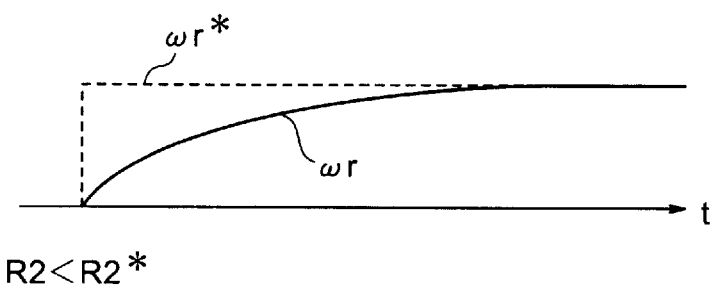

FIG. 11 is a partial block diagram showing a configuration of a vector controller for an induction motor according to an eighth embodiment of the present invention. In the vector controller of FIG. 6 and FIGS. 8 through 10 discussed above, the slip angular frequency correction value computing unit 30 calculates the slip angular frequency correction value Δωs. In the vector controller shown FIG. 11, the slip angular frequency command correction value Δωs is set according to the magnitude of a voltage command value E1R.

Referring to FIG. 11, a second selector switch 41 selects the slip angular frequency correction value Δωs or zero according to a switching signal cs1 from a second command switching unit 22A. The configuration and operation of the second command switching unit 22A are the same as those of the first command switching unit 22 of FIG. 5. The configuration of the vector controller shown in FIG. 11 can be applied to the vector controller shown in FIG. 6 and FIGS. 8 through 10.

An operation of the vector controller shown in FIG. 11 will now be described. The second selector switch 41 receives the switching signal cs1 from the second command switching unit 22A, and sets a fifth slip angular frequency correction value Δωs5* to zero when the switching signal cs1 is at a low level (L) or sets the slip angular frequency correction value Δωs calculated by the slip angular frequency correction value computing unit 30 as the fifth slip angular frequency correction value Δωs5* when the switching signal cs1 is at a high level (H).

The configuration of FIG. 11 can be applied to any one of the configurations shown in FIG. 6 and FIGS. 8 through 10. Depending on the configuration, the fifth slip angular frequency correction value Δωs5* is output to the sixth adder 24 shown in FIG. 6, the limiter 25 shown in FIG. 8, the fifth multiplier 26 shown in FIG. 9, or the sixth multiplier 28 shown in FIG. 10. The rest of the operation of the vector controller shown in FIG. 11 is identical to that of the vector controller shown in FIG. 6 and FIGS. 8 through 10, and the description thereof will be omitted.

Thus, in the vector controller of FIG. 11, the fifth slip angular frequency correction value Δωs5* can be set to either the slip angular frequency correction value Δωs computed by the slip angular frequency correction value computing unit 30 or zero according to the voltage command E1R. This arrangement makes it possible to set an operation range in which the slip angular frequency should be corrected or not. For example, the computation for the secondary resistance correction can be avoided in an area wherein a value of the voltage command E1R is small and the slip angular frequency correction value Δωs is apt to incur a large error due to a primary resistance setting error or the like.

What is claimed is:

1. A vector controller for an induction motor, comprising:
    vector control command computing means for computing a d-axis current command value IDR, a q-axis current command value IQR and a slip angular frequency command value ωs* based on a torque command value T*, a secondary magnetic flux command value Φ2* and an induction motor constant of an induction motor to be controlled;
    revolution angular frequency computing means for computing a revolution angular frequency ωr of the induction motor;
    inverter angular frequency computing means for computing an inverter angular frequency ωinv by adding the slip angular frequency command value ωs* and the revolution angular frequency ωr;
    dq-axis feed-forward voltage computing means for computing a d-axis feed-forward voltage command value E1DFF and a q-axis feed-forward voltage command value E1QFF by using the d-axis current command value IDR, the q-axis current command value IQR, the induction motor constant and the inverter angular frequency ωinv;
    feed-forward voltage vector computing means for computing a feed-forward voltage command value E1F by computing a square root value of a square sum of the d-axis feed-forward voltage command value E1DFF and the q-axis feed-forward voltage command value E1QFF;
    feedback current computing means for computing a d-axis feedback current IDF and a q-axis feedback current IQF from a three-phase current value of the induction motor;
    compensation voltage computing means for computing a d-axis compensation voltage E1DFB from a difference between the d-axis current command value IDR and the d-axis feedback current IDF, and for computing a q-axis compensation voltage E1QFB from a difference between the q-axis current command value IQR and the q-axis feedback current IQF;
    dq-axis voltage command value computing means for computing a d-axis voltage command value E1DR by adding the d-axis compensation voltage E1DFB and the d-axis feed-forward voltage command value E1DFF, and for computing a q-axis voltage command value E1QR by adding the q-axis compensation voltage E1QFB and the q-axis feed-forward voltage command value E1QFF;
    voltage vector computing means for determining a voltage command value E1R by computing a square root value of a square sum of each of the d-axis voltage command value E1DR and the q-axis voltage command value E1QR; and
    secondary resistance correction value computing means for adjusting a correction value ΔR2 of a secondary resistance so that a difference between the feed-forward voltage command value E1F and the voltage command value E1R becomes zero;
    wherein the vector control command computing means employs an induction motor constant that has been corrected by the correction value ΔR2 of the secondary resistance to compute the slip angular frequency command value ωs* to thereby conduct vector control of the induction motor.

2. A vector controller for an induction motor as claimed in claim 1, further comprising a limiter that is provided between the secondary resistance correction value computing means and the vector control command computing means, and restricts a value of the correction value ΔR2 of the secondary resistance to a predetermined range.

3. A vector controller for an induction motor as claimed in claim 1, further comprising a first switching means that is provided between the secondary resistance correction value computing means and the vector control command computing means, and determines whether a value of the correction value ΔR2 of the secondary resistance should be supplied to the vector control command computing means based on a value of the voltage command value E1R.

4. A vector controller for an induction motor comprising:
    vector control command computing means for computing a d-axis current command value IDR, a q-axis current command value IQR, and a slip angular frequency command value ωs* based on a torque command value T*, a secondary magnetic flux command value Φ2*, and an induction motor constant of an induction motor to be controlled;
    revolution angular frequency computing means for computing a revolution angular frequency ωr of the induction motor;

inverter angular frequency computing means for computing an inverter angular frequency $\omega inv$ by adding the slip angular frequency command value $\omega s^*$ and the revolution angular frequency $\omega r$;

dq-axis feed-forward voltage computing means for computing a d-axis feed-forward voltage command value E1DFF and a q-axis feed-forward voltage command value E1QFF by using the d-axis current command value IDR, the q-axis current command value IQR, the induction motor constant, and the inverter angular frequency $\omega inv$;

feed-forward voltage vector computing means for computing a feed-forward voltage command value E1F by computing a square root value of a square sum of the d-axis feed-forward voltage command value E1DFF and the q-axis feed-forward voltage command value E1QFF;

feedback current computing means for computing a d-axis feedback current IDF and a q-axis feedback current IQF from a three-phase current value of the induction motor;

compensation voltage computing means for computing a d-axis compensation voltage E1DFB from a difference between the d-axis current command value IDR and the d-axis feedback current IDF, and for computing a q-axis compensation voltage E1QFB from a difference between the q-axis current command value IQR and the q-axis feedback current IQF;

dq-axis voltage command value computing means for computing a d-axis voltage command value E1DR by adding the d-axis compensation voltage E1DFB and the d-axis feed-forward voltage command value E1DFF, and for computing a q-axis voltage command value E1QR by adding the q-axis compensation voltage E1QFB and the q-axis feed-forward voltage command value E1QFF;

voltage vector computing means for determining a voltage command value E1R by computing a square root value of a square sum of each of the d-axis voltage command value E1DR and the q-axis voltage command value E1QR; and slip angular frequency correction value computing means for adjusting a correction value $\Delta \omega s$ of a slip angular frequency so that a difference between the feed-forward voltage command value E1F and the voltage command value E1R becomes zero;

wherein the inverter angular frequency computing means employs a slip angular frequency that has been corrected by the correction value $\Delta \omega s$ of the slip angular frequency to compute the inverter angular frequency $\omega inv$ to thereby conduct vector control of the induction motor.

5. A vector controller for an induction motor as claimed in claim 4, further comprising a limiter that is provided between the slip angular frequency correction value computing means and the inverter angular frequency computing means, and restricts a value of the correction value $\Delta \omega s$ of the slip angular frequency to a predetermined range.

6. A vector controller for an induction motor as claimed in claim 4, further comprising first correcting means that is provided between the slip angular frequency correction value computing means and the inverter angular frequency computing means, and corrects a value of the correction value $\Delta \omega s$ of the slip angular frequency according to the torque command value $T^*$.

7. A vector controller for an induction motor as claimed in claim 4, further comprising second correcting means that is provided between the slip angular frequency correction value computing means and the inverter angular frequency computing means, and corrects a value of the correction value $\Delta \omega s$ of the slip angular frequency according to the q-axis current command value IQR.

8. A vector controller for an induction motor as claimed in claim 4, further comprising second switching means that is provided between the slip angular frequency correction value computing means and the inverter angular frequency computing means, and determines whether a value of the correction value $\Delta \omega s$ of the slip angular frequency should be supplied to the inverter angular frequency computing means based on a value of the voltage command value E1R.

* * * * *